United States Patent
Kesek et al.

(10) Patent No.: US 12,421,995 B2
(45) Date of Patent: Sep. 23, 2025

(54) PROPELLER SHAFT WITH REINFORCED FRONT FLANGE

(71) Applicant: PRATT & WHITNEY CANADA CORP., Longueuil (CA)

(72) Inventors: Mateusz Kesek, Nagawczyna (PL); Tomasz Rozputynski, Hyżne (PL)

(73) Assignee: PRATT & WHITNEY CANADA CORP., Longueuil (CA)

( * ) Notice: Subject to any disclaimer, the term of this patent is extended or adjusted under 35 U.S.C. 154(b) by 453 days.

(21) Appl. No.: 17/932,756

(22) Filed: Sep. 16, 2022

(65) Prior Publication Data
US 2024/0093720 A1    Mar. 21, 2024

(51) Int. Cl.
*F16C 3/02*    (2006.01)
*B64D 35/00*    (2006.01)

(52) U.S. Cl.
CPC ............... *F16C 3/02* (2013.01); *B64D 35/00* (2013.01); *F16C 2240/70* (2013.01); *F16C 2240/90* (2013.01); *F16C 2326/43* (2013.01); *Y10S 4/14* (2013.01)

(58) Field of Classification Search
CPC .... F16C 3/02; F16C 2240/70; F16C 2240/90; F16C 2326/43; B64D 35/00; Y10S 4/14
USPC .................................................. 464/182, 183
See application file for complete search history.

(56) References Cited

U.S. PATENT DOCUMENTS

| | | | |
|---|---|---|---|
| 2,828,956 A * | 4/1958 | Bieniosek | C21C 5/4606 239/589 |
| 3,322,200 A | 5/1967 | Charles | |
| 3,585,815 A * | 6/1971 | Hubbard | A01D 57/02 464/182 |
| 4,406,640 A | 9/1983 | Franklin et al. | |
| 4,451,245 A | 5/1984 | Hoernig et al. | |
| 4,706,364 A | 11/1987 | Aubry | |
| 4,849,152 A | 7/1989 | Rumberger | |
| 5,421,781 A | 6/1995 | MacKellar | |
| 7,322,180 B2 | 1/2008 | Lapergue et al. | |
| 7,874,925 B2 | 1/2011 | Dewhirst | |
| 8,161,623 B2 | 4/2012 | Baechle et al. | |

(Continued)

FOREIGN PATENT DOCUMENTS

| | | |
|---|---|---|
| CA | 3149073 A1 | 8/2022 |
| CN | 110605528 | 12/2019 |

(Continued)

*Primary Examiner* — Greg Binda
(74) *Attorney, Agent, or Firm* — NORTON ROSE FULBRIGHT CANADA LLP (57) ABSTRACT

A propeller shaft assembly for an aircraft engine includes a shaft having: an annular wall extending circumferentially about a shaft axis and circumscribing a hollowed interior defining a cavity in a front end portion of the shaft, the annular wall having an outer surface and an inner surface facing radially inwardly to the cavity; and a front flange projecting radially outwardly from the annular wall. The front flange includes a hub side surface defining an interface plane and adapted to abut with a propeller hub. The shaft also includes a reinforcement web defining an end wall of the cavity, the reinforcement web extending radially inwardly from the inner surface of the annular wall. At least part of the reinforcement web is radially aligned with the front flange. At least one perforation extends axially through the reinforcement web.

18 Claims, 8 Drawing Sheets

(56) References Cited

U.S. PATENT DOCUMENTS

| | | | |
|---|---|---|---|
| 8,167,727 B2 * | 5/2012 | Anema | F16D 3/185 |
| 8,734,017 B1 | 5/2014 | Colson et al. | |
| 9,216,495 B2 | 12/2015 | Farineau | |
| 11,466,725 B2 | 10/2022 | Pethick et al. | |
| 11,994,141 B2 | 5/2024 | Merritt et al. | |
| 12,078,211 B2 | 9/2024 | Geislinger et al. | |
| 2008/0012329 A1 | 1/2008 | Dewhirst | |
| 2014/0179450 A1 | 6/2014 | Chang | |
| 2017/0191559 A1 | 7/2017 | Russ | |
| 2019/0072080 A1 | 3/2019 | Lemma et al. | |
| 2021/0071646 A1 | 3/2021 | Schroer | |
| 2022/0112846 A1 | 4/2022 | Dionne | |
| 2024/0093720 A1 | 3/2024 | Kesek et al. | |
| 2024/0093721 A1 * | 3/2024 | Kesek | F16C 3/023 |

FOREIGN PATENT DOCUMENTS

| | | |
|---|---|---|
| DE | 4313296 A1 | 6/1994 |
| DE | 19842821 A1 | 4/2000 |
| EP | 1956187 A2 | 8/2008 |
| FR | 2643686 A1 | 8/1990 |
| GB | 2558190 | 7/2018 |
| KR | 20080036309 A | 4/2008 |
| KR | 20180121173 A | 11/2018 |
| WO | 2013190459 A1 | 12/2013 |

* cited by examiner

PROPELLER SHAFT WITH REINFORCED FRONT FLANGE

TECHNICAL FIELD

The application relates generally to aircraft engines and, more particularly, to propeller shaft assemblies for such engines.

BACKGROUND

Propeller shafts are subjected to significant bending moments resulting from airplane maneuvers—due to aerodynamic and gyroscopic loads, for instance—, and/or propeller shape or size, amongst other possibilities. During operation of the engine, the front portion of the propeller shaft is an area subjected to high stress amplitudes and concentration caused by cyclic external loads during operation of the engine. The front portion of the propeller shaft about a propeller shaft/hub interface may be exposed to high stress from engine operation and/or service damage during the mounting and the unmounting of the propeller hub to the shaft and/or as the front portion of the shaft is exposed to the environment for engine maintenance. Limiting and/or controlling stress concentration in such area therefore remains a concern for increasing engine safety and extending service life.

SUMMARY

There is accordingly provided a propeller shaft assembly for an aircraft engine, comprising: a shaft having: a front end portion extending from a front end of the shaft; an annular wall extending circumferentially about a shaft axis and circumscribing a hollowed interior defining a cavity in the front end portion, the annular wall having an outer surface facing radially outwardly from the shaft and an inner surface spaced apart from the outer surface and facing radially inwardly to the cavity; a front flange projecting radially outwardly from the annular wall, the front flange defining a hub side surface and an engine side surface opposite the hub side surface and axially spaced apart therefrom, the hub side surface of the front flange defining an interface plane and adapted to abut with a propeller hub; and a reinforcement web defining an end wall of the cavity, the reinforcement web extending radially inwardly from the inner surface of the annular wall, at least part of the reinforcement web radially aligned with the front flange, at least one perforation extending axially through the reinforcement web, the at least one perforation open at the front end of the shaft and in fluid flow communication with the cavity.

The propeller shaft assembly as defined above and described herein may further include one or more of the following features, in whole or in part, and in any combination.

In certain aspects, the reinforcement web defines a fillet facing inwardly towards the central axis, the fillet located on an engine side of the reinforcement web opposite a hub side of the reinforcement rib, the front flange defines a fillet facing outwardly away from the central axis, the fillet of the front flange located on an engine side of the front flange opposite a hub side of the front flange.

In certain aspects, the fillet of the reinforcement web extends axially along the central axis from a front fillet end to a rear fillet end, the rear fillet end axially offset from that of the fillet of the front flange.

In certain aspects, the fillet of the reinforcement web has a radius R2 and the fillet of the front flange has a radius R1, a ratio of R2 over R1 having a value of at least 0.2 and at most 3.0.

In certain aspects, at least part of the fillet of the reinforcement web is radially aligned with the fillet of the front flange along the central axis.

In certain aspects, the reinforcement web has a hub side surface and an engine side surface opposite the hub side surface, the reinforcement web having a minimum thickness TR measured along the central axis of the shaft, from the hub side surface to the engine side surface of the reinforcement web, the front flange having a minimum thickness T measured along the central axis of the shaft, from the hub side surface to the engine side surface of the front flange, a ratio TR over T having a value between 0.1 and 3.0.

In certain aspects, the shaft has an equivalent open cross-section at the front end of the shaft, the equivalent open cross-section delimited peripherally by an axial projection of the inner surface of the annular wall, the at least one perforation having a total surface area equal to between 10% and 80% of the equivalent open cross-section.

In certain aspects, the reinforcement web includes a plurality of the perforations in fluid flow communication with the cavity, the total surface area being the total surface area of the plurality of the perforations.

In certain aspects, the at least one perforation has a round shape, an elongated slot shape or a teardrop shape.

In certain aspects, the reinforcement web has a wall having a hub side surface and an engine side surface opposite the hub side surface, the engine side surface of the front flange extending axially beyond the engine side surface of the reinforcement web in a direction extending away from the front end of the shaft along the central axis.

In certain aspects, the reinforcement web has a front surface facing in a direction opposite that of the engine side surface of the front flange, the front surface axially offset from the front end of the shaft along the central axis.

In certain aspects, the front surface of the reinforcement web is axially offset with respect to the hub side surface of the front flange along the central axis, the hub side surface of the front flange closer from the front end of the shaft than the front surface of the reinforcement web is from the front end of the shaft.

In certain aspects, the propeller hub is removably secured to the front flange, the propeller hub having a flange engaging surface axially engaging the hub side surface of the front flange when secured to the front flange.

There is further provided a propeller shaft for a propeller shaft assembly of an aircraft engine, the propeller shaft having: an annular wall extending circumferentially about a shaft axis and circumscribing a hollowed interior defining a cavity in a front end portion of the shaft, the annular wall having an outer surface facing radially outwardly from the shaft and an inner surface spaced apart from the outer surface and facing radially inwardly to the hollowed interior; a front flange projecting radially outwardly away from the annular wall, the front flange defining a hub side surface and an engine side surface opposite the hub side surface and axially spaced apart therefrom, the hub side surface of the front flange defining an interface plane and adapted to abut with a propeller hub; and a reinforcement web having at least one perforation extending therethrough, the reinforcement web extending transversely through the cavity and intersecting the shaft axis, wherein at least part of the reinforcement web is radially aligned with the front flange.

The propeller shaft assembly as defined above and described herein may further include one or more of the following features, in whole or in part, and in any combination.

In certain aspects, the reinforcement web defines a fillet facing inwardly towards the central axis, the fillet located on an engine side of the reinforcement web opposite a hub side of the reinforcement web, the front flange defines a fillet facing outwardly away from the central axis, the fillet of the front flange located on an engine side of the front flange opposite a hub side of the front flange.

In certain aspects, at least part of the fillet of the reinforcement web is radially aligned with the fillet of the front flange along the central axis.

In certain aspects, the fillet of the reinforcement web extending axially along the central axis from a front fillet end to a rear fillet end, the rear fillet end axially offset from that of the fillet of the front flange.

In certain aspects, the fillet of the reinforcement web has a radius R2 and the fillet of the front flange has a radius R1, wherein a ratio of R2 over R1 having a value of at least 0.2 and at most 3.0.

In certain aspects, the shaft has an equivalent open cross-section at the front end of the shaft, the equivalent open cross-section delimited peripherally by an axial projection of the inner surface of the annular wall, the at least one perforation having a total surface area equal to between 10% and 80% of the equivalent open cross-section.

In certain aspects, the reinforcement web includes a plurality of the perforations in fluid flow communication with the cavity, the total surface area being the total surface area of the plurality of the perforations.

BRIEF DESCRIPTION OF THE DRAWINGS

Reference is now made to the accompanying figures in which.

DETAILED DESCRIPTION

Figure 1:
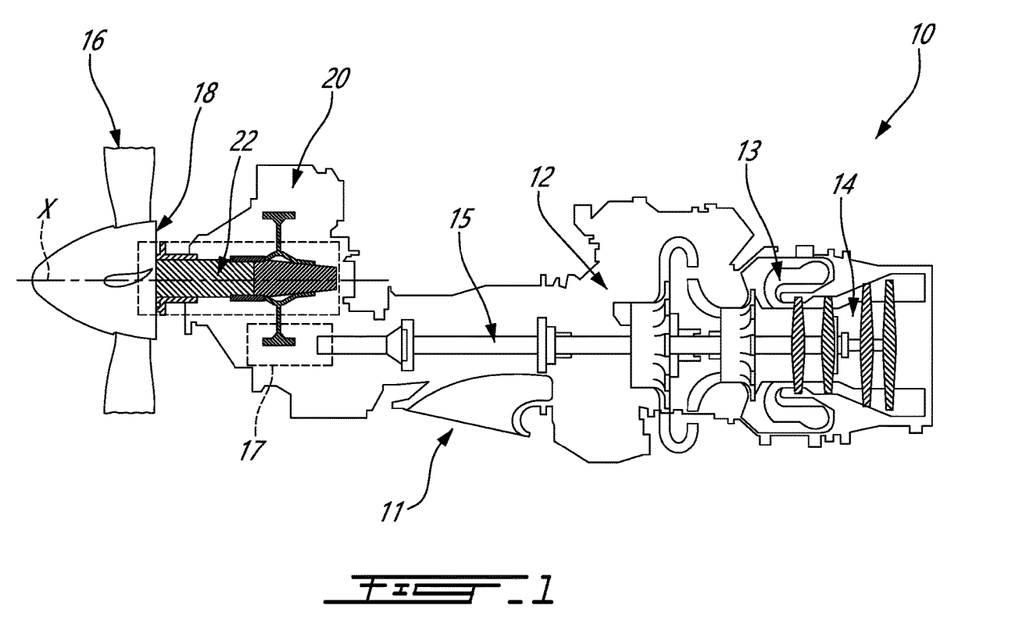
FIG. 1 is a schematic cross sectional view of an aircraft engine having a propeller shaft assembly.

FIG. 1 illustrates an aircraft engine 10 of a type preferably provided for use in subsonic flight, generally comprising in serial flow communication an air intake 11 through which air is drawn, a compressor section 12 within which the air is compressed, a combustor 13 in which the compressed air is mixed with fuel and ignited for generating an annular stream of hot combustion gases, and a turbine section 14 for extracting energy from the combustion gases.

The aircraft engine 10 of FIG. 1 is a turboprop engine, and therefore includes a power output shaft 15 connected to and driven by one or more of the turbines from the turbine section 14 to transmit a driving force to a propeller 16 of the aircraft via a propeller shaft assembly 20, with or without a reduction gearbox 17 between the output shaft 15 and the propeller shaft assembly 20. In some embodiments, the output shaft 15 could be in direct driving engagement with the propeller 16, for example.

The propeller shaft assembly 20 has at least one propeller shaft 22 (or simply, shaft 22). The shaft 22 defines a propeller hub interface adapted to be coupled with a propeller hub 18 of the propeller 16, as further described later. The shaft 22 has a shaft axis X, which may be coextensive with a rotation axis of the propeller 16 in at least some embodiments. Stated otherwise, in at least some embodiments, the propeller 16 may be mounted for rotation about the shaft axis X to the shaft 22. The rotational axis of the propeller 16 and the shaft axis X could be non-coextensive in other embodiments.

Figure 2A:
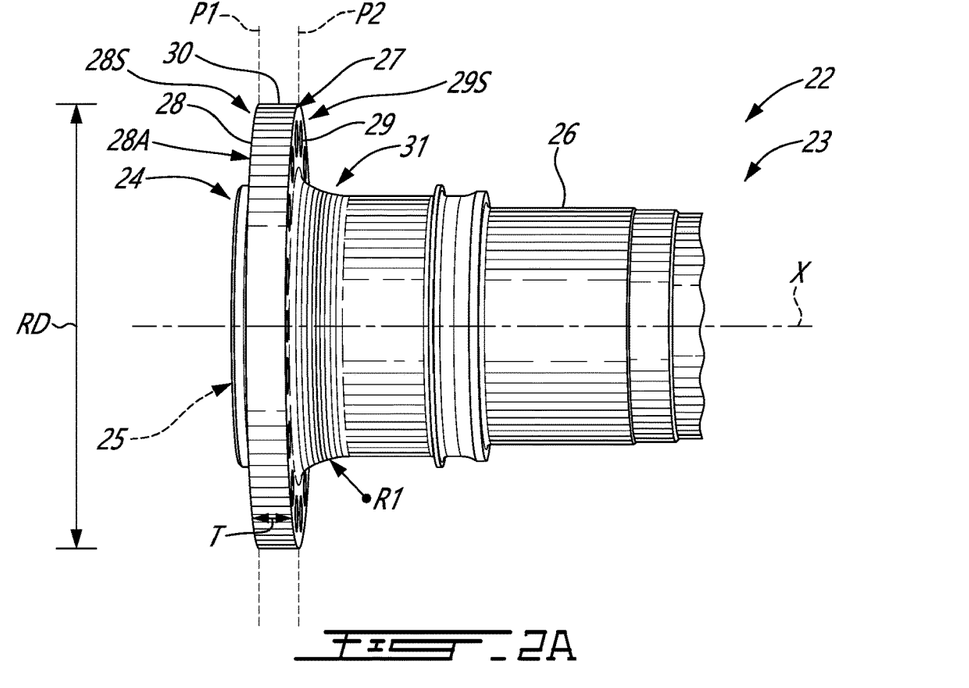
FIG. 2A is a longitudinal view of a portion of a shaft of the propeller shaft assembly of the aircraft engine of FIG. 1.
Figure 2B:
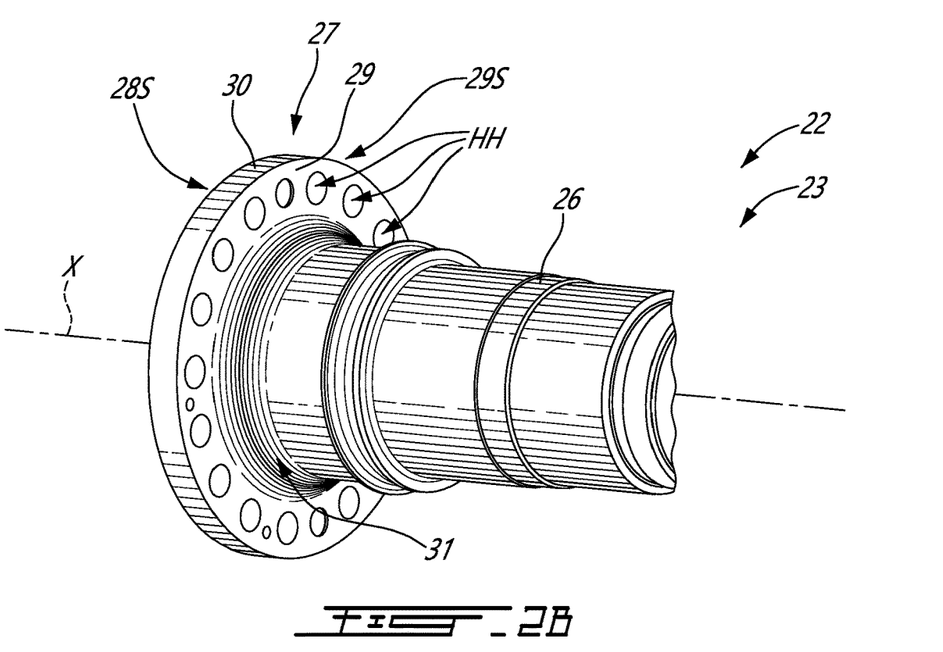
FIG. 2B is perspective view of the portion of the shaft of FIG. 2A.

Other aspects of the propeller shaft assembly 20 are now described with reference to FIGS. 2A-2B, which show a front end portion 23 of the shaft 22. As shown, the shaft 22 has a front end 24. The front end 24 is the forwardmost point of the shaft 22, which engages with the propeller 16. The shaft 22 is hollowed at least in the front end portion 23. The shaft 22 has a hollowed interior. As will be described later, the hollowed interior may be at least partially closed at the front end 24. The hollowed interior may define a cavity 25 (or chamber) within the shaft 22. The cavity 25 can be seen in the following figures. The cavity 25 may serve as a fluid channel for fluid flow communication with the propeller hub 18. Pressurized oil, or other fluid, may be supplied to propeller control systems/units and/or blade actuators, through the cavity 25.

The shaft 22 has an outer surface 26 facing radially outwardly from the shaft 22. The outer surface 26 may be supported by bearings (not shown) or other components for rotation of the shaft 22 about the shaft axis X. Seals, rings or other engine components may also interface with the shaft 22 along the outer surface 26.

The shaft 22 has a front flange 27 which extends radially outwardly from the outer surface 26. The front flange 27 is adapted to engage and/or mate with the propeller hub 18, which will be further described later. The front flange 27 has a disc shape and extends circumferentially about the shaft axis X. Other shapes may be contemplated, whether or not extending circumferentially about a full circumference of the shaft 22. For example, the front flange 27 could define separate flange segments extending outwardly from the outer surface 26. The front flange 27 could have a non circular shape, such as an oval shape, square shape, polygonal shape, or have an irregular outline, as some other examples. The front flange 27 defines a hub side surface 28 and an engine side surface 29 axially spaced apart from the hub side surface. 28 The hub side surface 28 and the engine side surface 29 face away from each other, here in opposite directions. The hub side surface 28 defines a hub interface 28A. As further described later, the hub interface 28A may abut against the propeller hub 18 when the front flange 27 is coupled therewith.

In at least some embodiments, the hub side surface 28 and the engine side surface 29 are flat surfaces. As shown, the hub side surface 28 extends in a plane P1 and the engine side surface 29 extends in a plane P2. In the embodiment shown, the planes P1 and P2 are parallel one to another, so are the surfaces 28, 29. The planes P1 and P2 could have a different relative orientation in other embodiments. For example, the planes P1 and P2, and/or the hub side surface 28 and the engine side surface 29 could extend angularly relative to each other. As another example, the hub side surface 28 and/or the engine side surface 29 could have an irregular, convex, concave, or other outlines. The hub side surface 28 and/or the engine side surface 29 could also define ribs, grooves, or keying features, for example.

The front flange 27 has an outer periphery 30 extending between the hub side surface 28 and the engine side surface 29. The outer periphery 30 defines a radialmost surface of the front flange 27 which extends annularly about the front flange 27. The outer periphery 30 joins the hub side surface 28 to the engine side surface 29.

The front flange 27 has a thickness T and a radial outer dimension RD. The thickness T is a maximum thickness which may be measured from the hub side surface 28 to the engine side surface 29 (or vice versa). The thickness T may be uneven, depending on the outline of the surfaces 28, 29 as discussed above, for example. The radial outer dimension RD may correspond to an outer diameter in the embodiments where the front flange 27 has a disc shape, such as shown, or oval shape. The radial outer dimension RD may be measured at the outer periphery 30. The radial outer dimension RD may be a maximum outer dimension of the front flange 27, e.g., where the flange outline and/or outer periphery 30 is irregular or non-circular.

The front flange 27 has a plurality of holes HH extending therethrough. The holes HH extend from the hub side surface 28 to the engine side surface 29. In the embodiment shown, the holes HH are circumferentially spaced apart from each other in the front flange 27. These holes HH may receive fasteners for removably coupling the front flange 27 to the propeller hub 18. The front flange 27 and the propeller hub 18 could be coupled in other suitable manner, such as via male-female connections, interlocking features, threads, lock rings, keying features, for example.

The front flange 27 has a base 31 which merges with the outer surface 26 of the shaft 22. The base 31 may be referred to as a transition area between the front flange 27 and the outer surface 26. The base 31 of the front flange 27 is located on an engine side 29S of the front flange 27 opposite a hub side 28S of the front flange 27. The base 31, or transition area, may extend axially between the engine side surface 29 of the front flange 27 and the outer surface 26 of the shaft 22. The base 31, or transition area, may be defined as shaft wall section having a progressively reducing wall thickness from the outer periphery 30 and/or radialmost surface of the front flange 27 to the outer surface 26 of the shaft 22. In an embodiment, the base 31 defines a fillet having a radius R1. Stated otherwise, a fillet is defined between the front flange 27 and the outer surface 26 of the shaft 22. As shown, the fillet defined by the base 31 faces outwardly away from the central axis X. In an embodiment, the radius R1 is constant over the entire axial dimension of the fillet. The radius R1 could vary along a cord length of the fillet. The base 31 could define a chamfer, in other embodiments. A progressively reducing radial thickness of the shaft wall at the base 31 of the front flange 27 may limit stress amplitude and concentration in such transition area between the front flange 27 and the outer surface 26. It may also facilitate the manufacturing, depending on the manufacturing technique used (e.g., machining, casting, molding), in contrast with a right-angled corner, for example. Even with such progressively reducing radial thickness of the shaft wall at the base 31 of the front flange 27, high stress amplitudes may still exist in such transition area during operation because of the loads e.g., bending moments, imparted by the rotating propeller 16. In operation, airplane maneuvers, aerodynamic and gyroscopic loads transmitted to the front flange 27 via the rotating propeller 16 may cause cyclic stresses and/or loadings in such transition area, which receives a substantial proportion, if not all, of the loads produced by the rotating propeller 16. Stress concentration in such area, with high stress amplitudes, may affect the service life of the shaft 22, hence the engine 10 over time. For engine certification purposes, including compliance with damage tolerance regulations, for example, improvements over previous designs of propeller shaft assemblies may be sought in response to the evolving requirements specification and increasing performance needs of the engine 10. However, various cumulative design constraints may be involved, such as proximity with other parts in the engine 10, various interfaces with such parts, limited space, tight tolerances for part assemblies, and weight control.

Referring to FIGS. 3A to 3D, various embodiments of the propeller shaft assembly 20 of the present disclosure which address the above concerns will be presented. As further described later with reference to FIGS. 3A to 3D, the shaft 22 has a reinforcement web 40 extending radially inwardly of the front flange 27 and least partially aligned therewith along the central axis X of the shaft 22. The reinforcement web 40 also extends transversely through the cavity 25, which is defined in the front end portion of the shaft, and intersects the shaft axis X.

Figure 3A:
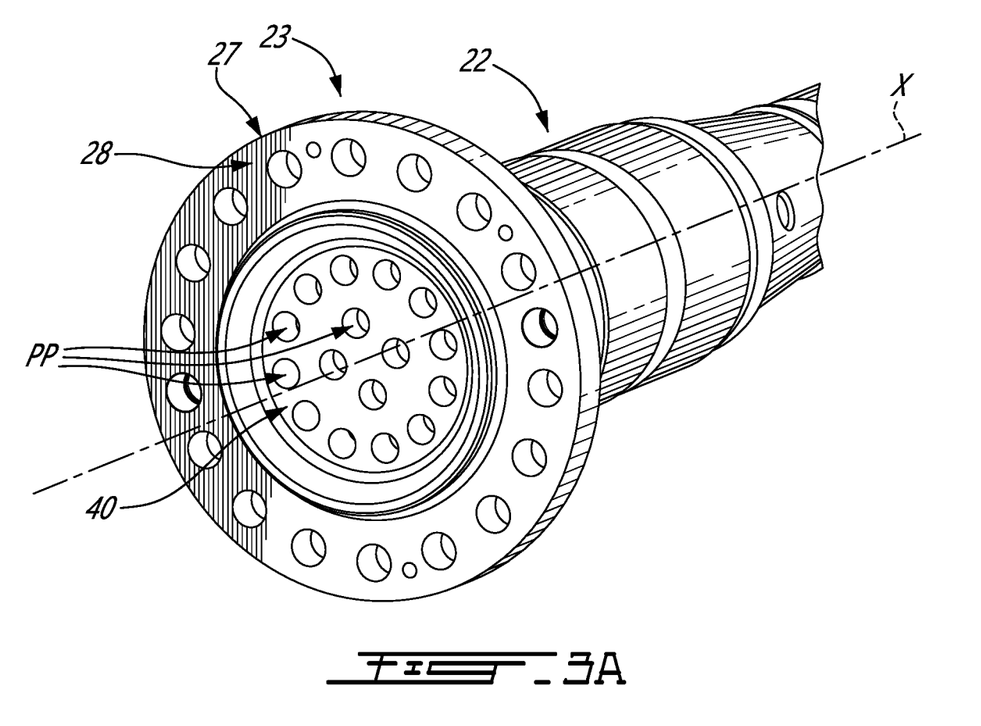
FIG. 3A is a perspective view of the portion of the shaft of FIGS. 2A-2B, according to an embodiment.
Figure 3B:
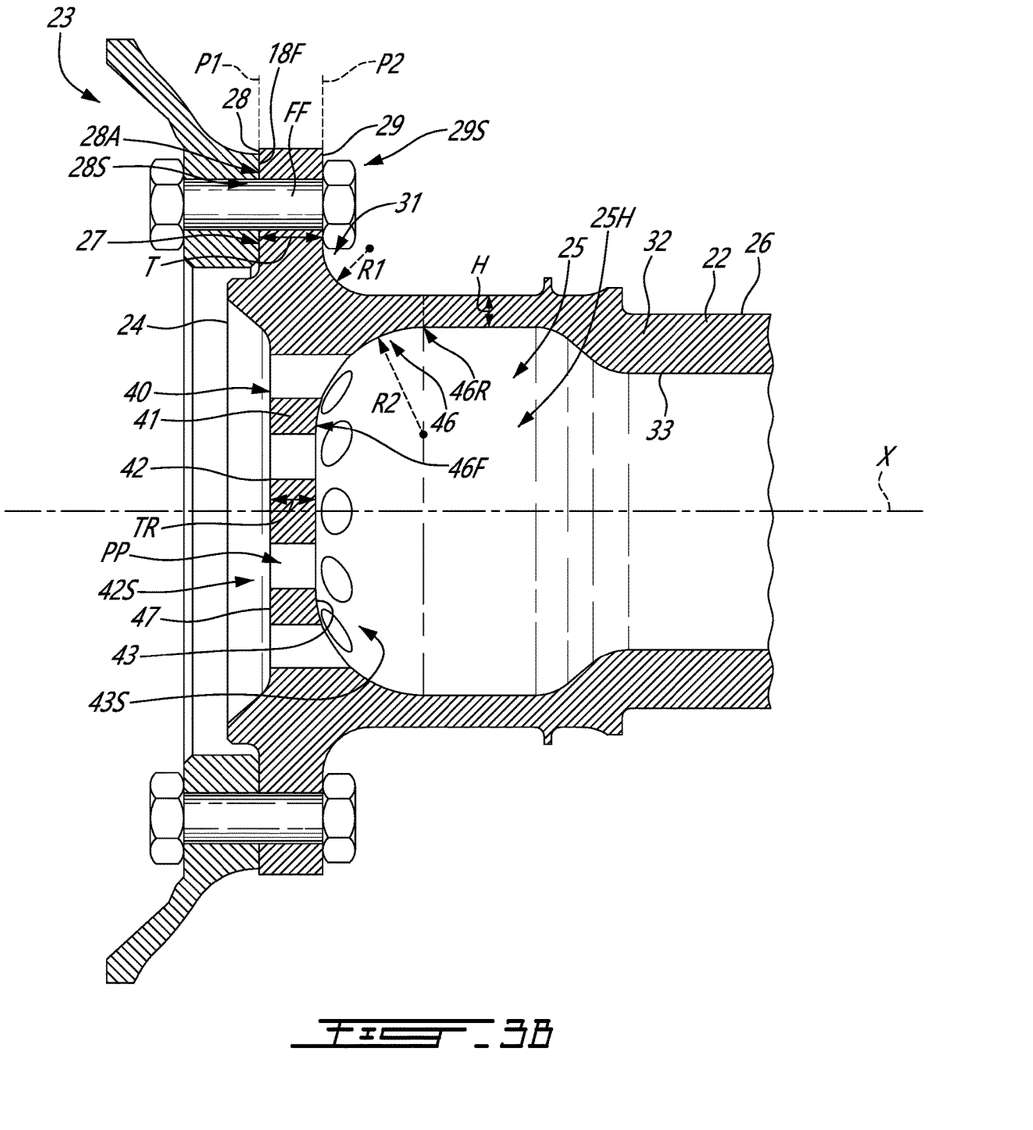
FIG. 3B is a cross-sectional view of the portion of the shaft of FIGS. 2A-2B and a propeller hub mounted to the shaft, according to another embodiment.
Figure 3C:
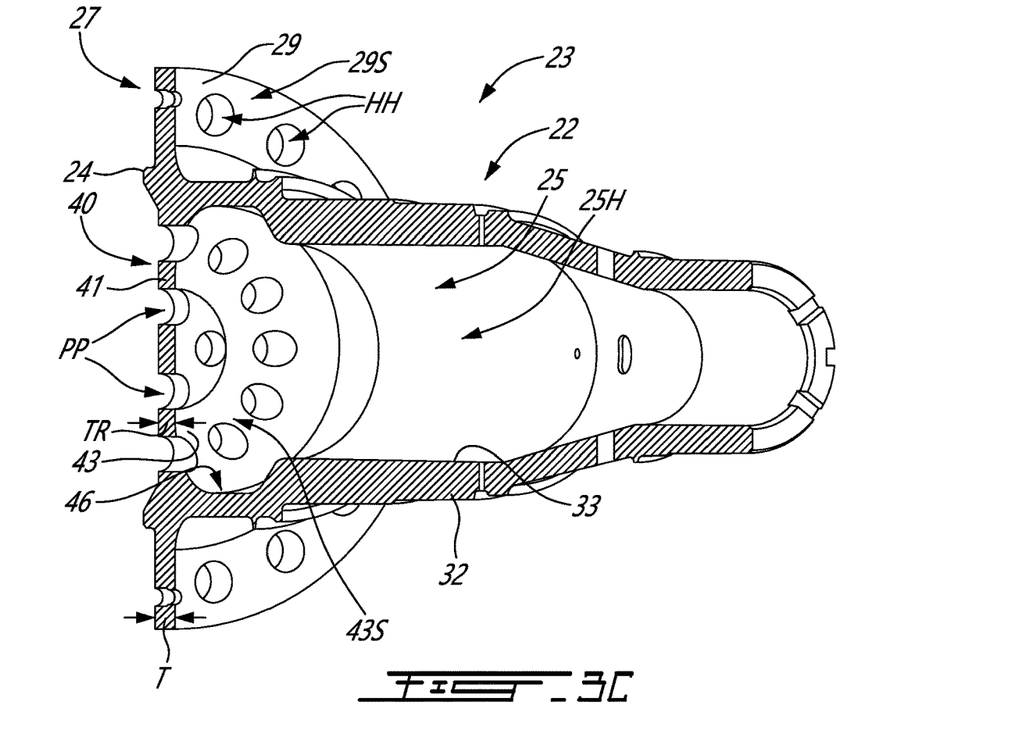
FIG. 3C is a perspective cross-sectional view of the portion of the shaft of FIGS. 2A-2B, according to yet another embodiment.

FIGS. 3A-3B illustrate a front end portion 23 of the shaft 22 of the propeller shaft assembly 20. In FIG. 3B, the propeller hub 18 is shown. The propeller hub 18 is removably coupled to the front flange 27 of the shaft 22 via a plurality of fasteners FF. The propeller hub 18 has a flange engaging surface 18F axially engaging the front flange 27 when secured to the front flange 27. The hub interface 28A of the front flange 27 abuts against the propeller hub 18. The propeller hub 18 and the front flange 27 have complementary surfaces for mating engagement. In the embodiment shown, the complementary surfaces of the propeller hub 18 and the front flange 27 are flat surfaces. Other surface outlines may be contemplated for the hub side surface 28 as described above, so is for the flange engaging surface 18F of the propeller hub 18 interfacing therewith by mating engagement.

As shown in FIG. 3A, the front end portion 23 of the shaft 22 is hollowed. The shaft 22 has a shaft annular wall 32, which extends circumferentially about shaft axis X and circumferentially surrounds, and thus circumscribes, a hollowed interior 25H defined within the shaft 22.

In at least some embodiments, such as shown, the shaft annular wall 32 has a section of constant (±5%) thickness H on an engine side (opposite the hub side) of the front flange 27. Such section may be referred to as a barrel section of the shaft 22. The barrel section is a section of the shaft 22 that extends adjacent from the base 31 (or end of the fillet). Such location is identified with a dotted line for visual reference. The barrel section may also be referred to as a cylindrical portion of the shaft 22. The axial extent of such barrel section/cylindrical portion of the shaft 22 may be measured from a point where the thickness of the shaft 22 becomes constant, adjacent the end of the base 31 (or fillet) of the front flange 27. Such barrel section/cylindrical portion of the shaft 22 may be absent in other embodiments, where, for instance, that section of the shaft 22 extending from the end of the base 31 (or fillet) may have a transient thickness, with a frustoconical or other non-cylindrical geometry.

The cavity 25 is defined by the hollowed interior 25H in the front end portion 23 of the shaft 22. The cavity 25 is surrounded circumferentially by the annular wall 32. The reinforcement web 40 defines an end wall of the cavity 25. As shown, the reinforcement web 40 extends radially inwardly with respect to the front flange 27, and/or radially inwardly from the annular wall 32. The shaft annular wall 32 has an inner surface 33 facing inwardly to the cavity 25. The inner surface 33 is spaced apart, radially, from the outer surface 26. The inner surface 33 may extend all the way through the shaft 22 from the reinforcement web 40, however this is optional.

The reinforcement web 40 may be referred to as an internal wall of the shaft 22, referring to the location of the reinforcement web 40. Indeed, the reinforcement web 40 extends radially inwardly on a cavity side of the annular wall 32 of the shaft 22. The reinforcement web 40 extends radially inwardly from the inner surface 33 of the annular wall 32. As indicated above, the reinforcement web 40 defines an end wall of the cavity 25. As shown, the reinforcement web 40 closes—at least partially—the front end 24 of the shaft 22. As shown, the central axis X intersects with the reinforcement web 40. The reinforcement web 40 includes at least one perforation PP—in the embodiment shown a plurality of perforations PP—so as to allow fluid flow communication in and/or out of the cavity 25 through the reinforcement web 40. The perforation(s) PP are thus in fluid flow communication with the cavity 25. The perforation(s) PP extend(s) through the reinforcement web 40 and is/are opened at the front end 24 of the shaft 22. In the depicted embodiments, the perforations PP extend substantially axially through the reinforcement web 40, that is the perforations PP extend in a direction substantially parallel to the central shaft axis X. As described above, pressurized oil, or other fluids, may be channeled through the hollowed interior 25H of the shaft 22 to propeller control systems/ units and/or blade actuators for example. The perforation(s) PP may thus define such fluid channel(s) between the hollowed interior 25H of the shaft 22 and these other systems/units. The number, sizes, and/or locations of the perforations PP may vary depending on the embodiments. For example, there may be more or less perforations PP, evenly or unevenly distributed within the reinforcement web 40, smaller or larger perforations PP, perforations PP of different sizes, etc.

Figure 3D:
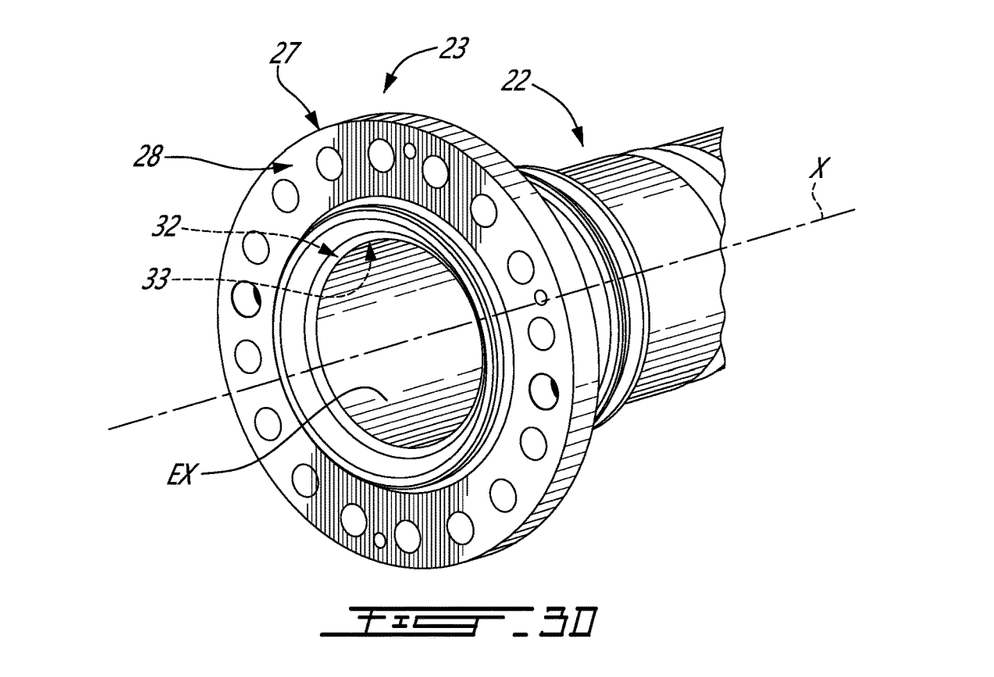
FIG. 3D is a partial perspective view of the portion of the shaft as in FIG. 3A illustrating an open cross-section of the shaft.
Figure 4A:
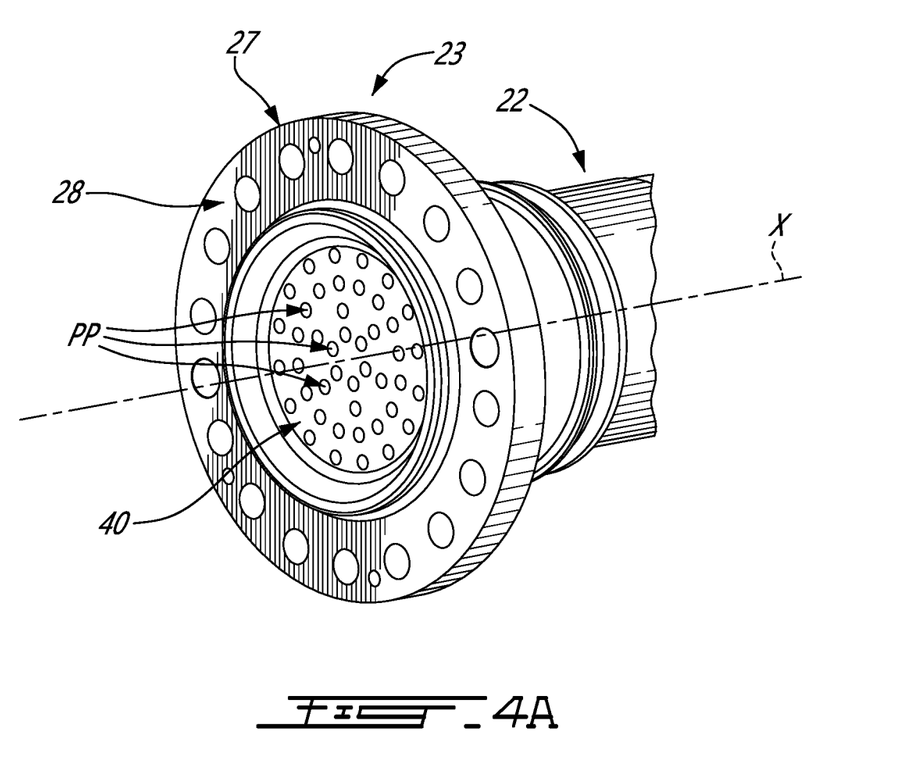
FIG. 4A is a perspective view of the portion of the shaft of FIGS. 2A-2B as in FIG. 3A, according to a embodiment.
Figure 4B:
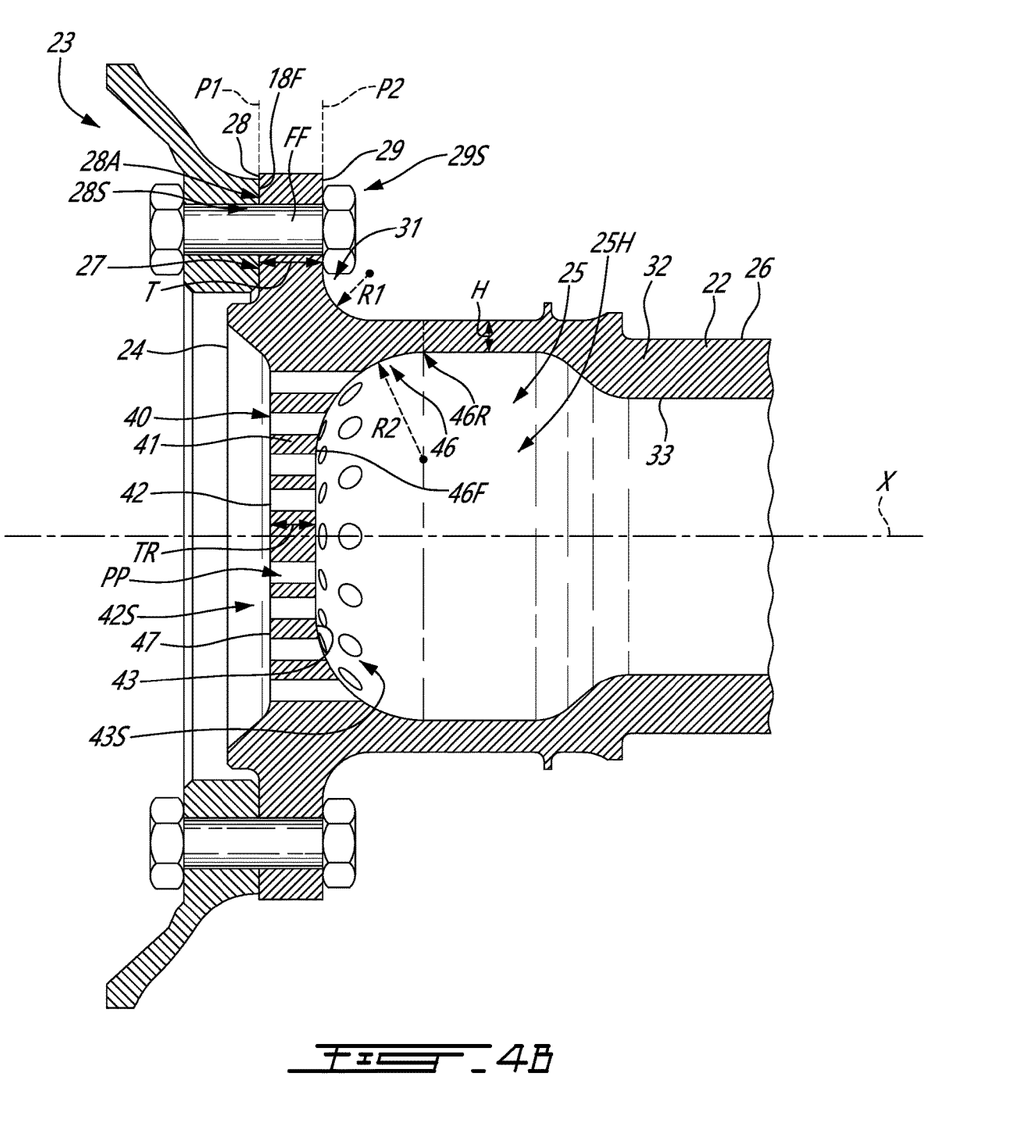
FIG. 4B is a cross-sectional view of the portion of the shaft of FIG. 4A.
Figure 5:
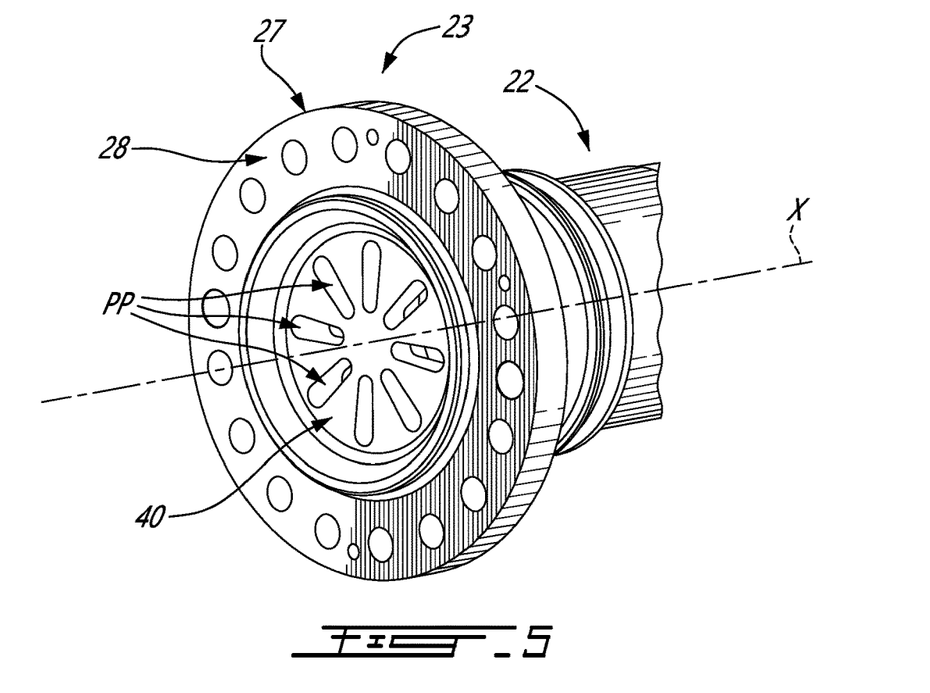
FIG. 5 is a perspective view of a variant of the portion of the shaft of FIGS. 2A-2B, according to an alternate embodiment.
Figure 6:
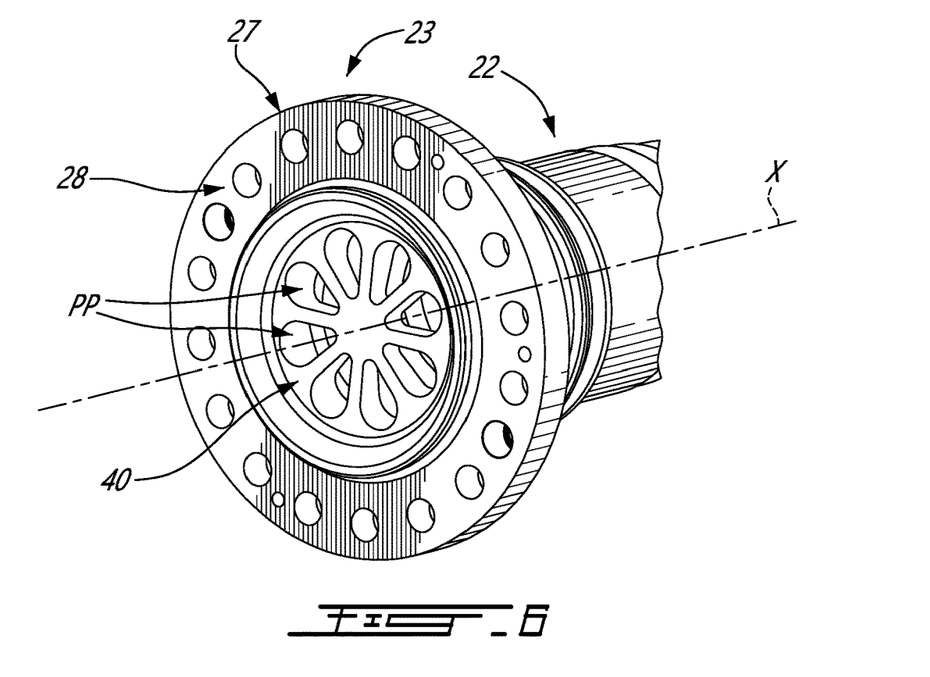
FIG. 6 is a perspective view of another variant of the portion of the shaft of FIGS. 2A-2B, as in FIG. 5.

As can be seen in an alternate embodiment illustrated in FIGS. 4A-4B, there may be a larger number of small perforations PP in at least some embodiments of the shaft 22 and propeller shaft assembly 20, when compared to what is shown in FIGS. 3A-3D. The perforations PP have a round shape, but other shapes could be contemplated. For example, in some variants illustrated in FIGS. 5-6, the perforation(s) PP may have an elongated slot shape through the reinforcement web 40 (FIG. 5), or the perforation(s) PP may have a teardrop shape (FIG. 6), whether or not circumferentially evenly distributed as shown.

Returning to FIGS. 3A-3D, further aspects of the reinforcement web 40 will now be described. In at least some embodiments, the reinforcement web 40 is plate like. The reinforcement web 40 may have a disc shape, (although perforated). As shown, the reinforcement web 40 takes up a majority of an open cross-section of the cavity 25. If the reinforcement web 40 were absent, the inner surface 33 of the annular wall 32 could define the outline of an equivalent open cross-section EX at the front end 24 of the shaft 22, as shown in FIG. 3D. Stated otherwise, the equivalent open cross-section EX may be delimited peripherally (here circumferentially since it is round) by an axial projection of the inner surface 33 of the annular wall 32 along the central axis X. This "equivalent" open cross-section EX is closed by the reinforcement web 40. Since the reinforcement web 40 includes perforation(s) PP, the reinforcement web 40 may be considered as partially closing the equivalent open cross-section EX. In at least some embodiments, a total surface area of the perforation(s) PP with respect to the equivalent open cross-section EX may be between 10% and 80%.

The reinforcement web 40 defines a localised zone of increased shaft wall thickness in an area where the shaft annular wall 32 is the most solicited by the bending moments imparted by the rotating propeller 16 (FIG. 1) during operation of the engine 10. The reinforcement web 40 may locally increase the stiffness of the shaft 22 and/or may allow a better stress distribution within the shaft annular wall 32 at the front flange 27. As shown, at least part of the reinforcement web 40 is radially aligned with the front flange 27 (that is, a radially extending axis normal to the central axis X would pass through at least part of the reinforcement rib 40 and the front flange 27 at a given point along the central axis X).

In at least some embodiments, such as shown, the reinforcement web 40 has an axial thickness TR along the central axis X of the shaft 22 that decreases in a radially inward direction towards the central axis X. This may limit the added weight contribution of the reinforcement web 40, when compared to shafts that would not have such reinforcement web 40. In some variants, the reinforcement web 40 could have a constant thickness TR in the radially inward direction. The reinforcement web 40 has a wall 41 having a hub side surface 42 and an engine side surface 43 opposite the hub side surface 42. The thickness TR may be measured in a direction along the central axis X of the shaft 22, from the hub side surface 42 to the engine side surface 43 of the reinforcement web 40. In at least some embodiments, a ratio of the thickness TR over the thickness T of the front flange may have a value between 0.1 and 3.0. The reinforcement web 40 may thus be thinner or thicker than (or even equal to) the front flange 27, depending on the embodiments. Having a reinforcement web 40 that is thinner than the front flange 27 may allow to limit the added weight contribution of the reinforcement web 40.

In at least some embodiments, such as shown in FIG. 3B, at least part of the engine side surface 43 of the reinforcement web 40 may extend parallel to the plane P2 containing the engine side surface 29 of the front flange 27. The engine side surface 43 of the reinforcement rib 40 may extend axially beyond in a direction extending away from the front end 24 of the shaft 22 along the central axis X, or closer to the front end 24 of the shaft 22 from the engine side surface 29 of the front flange 27, depending on the embodiments. Stated otherwise, the engine side surface 43 may be axially offset towards or away from the front end 24 of the shaft 22 with respect to the engine side surface 29 of the front flange 27, depending on the embodiments.

In at least some embodiments, the reinforcement web 40 defines a fillet 46 facing inwardly towards the central axis X. The fillet 46 is located on an engine side 43S of the reinforcement web 40 opposite a hub side 42S of the reinforcement web 40. The fillet 46 extends from, or is part of, the engine side surface 43 of the reinforcement web 40.

At least part of the fillet 46 of the reinforcement web 40 is radially aligned with the fillet (base 31) of the front flange 27 along the central axis X. The fillet 46 of the reinforcement web 40 extends axially along the central axis X from a front fillet end 46F to a rear fillet end 46R. In at least some embodiments, the rear fillet end 46R is axially offset from that of the base 31 (e.g., fillet when present), of the front flange 27. As such, the thickness H of the annular wall 32 of the shaft 22 at a location coinciding with the end of the base 31 of the front flange does not correspond to the minimum thickness of the shaft 22 in the front end portion 23.

The fillet 46 has a radius R2. The radius R2 may be constant over the entire axial dimension of the fillet 46 and/or the cord length thereof. The radius R2 could vary along a cord length of the fillet 46 in other embodiments. In at least some embodiments, where the base 31 of the front flange 27 defines a fillet, the radius R1 of the fillet of the base 31 may be smaller than the radius R2 of the fillet 46 of the reinforcement rib 40. However, this is optional, since R1 could be larger than R2. In at least some embodiments, a ratio of the radius R2 of the fillet 46 over the radius R1 of the fillet defined by the base 31 of the front flange 27 has a value of at least 0.2 and at most 3.0.

With continued reference to FIGS. 3A-3B, the reinforcement web 40 has a front surface 47. The front surface 47 is a disc shaped surface. In at least some embodiments, such as shown, the front surface 47 is flat, notwithstanding the perforation(s) PP. The front surface 47 faces in a direction opposite that of the engine side surface 29 of the front flange 27. In an embodiment, such as shown in FIG. 3A, the front surface 47 of the reinforcement web 40 is axially offset from the front end 24 of the shaft 22 along the central axis X. Stated otherwise, a recess is defined at the front end 24 of the shaft 22, with such recess extending from the front end 24 of the shaft 22 to the front surface 47 of the reinforcement web 40. In at least some embodiments, as shown in FIG. 3B, the front surface 47 of the reinforcement web 40 is axially offset with respect to the hub side surface 28 of the front flange 27 along the central axis X. In FIG. 3B, the hub side surface 28 of the front flange 27 is closer, axially, from the front end 24 of the shaft 22 than the front surface 47 is with respect to the front end 24. The front surface 47 of the reinforcement web 40 could be closer from the front end 24 of the shaft 22 than the hub side surface 28 is from the front end 24 of the shaft 22, in other embodiments. Other configurations may be contemplated. For example, the front surface 47 of the reinforcement web 40 could be a forwardmost surface of the shaft 22 in some variants.

According to the embodiments described hereinabove, a propeller shaft (22) for a propeller shaft assembly (20) of an aircraft engine (10) may be provided, with a hollowed interior in a front end portion (23) of the shaft (22). The shaft (22) has an annular wall (32) extending about the hollowed interior. The annular wall has an outer surface (26) which faces radially outwardly from the shaft (22). The shaft (22) has an inner surface (32) which faces radially inwardly to the hollowed interior and which is spaced apart from the outer surface (26). The shaft (22) has a front flange (27) which projects radially outwardly away from the hollowed interior. The front flange (27) has a hub side surface (28) and an engine side surface (29) opposite the hub side surface (28) and axially spaced apart therefrom. The hub side surface (28) of the front flange (27) defines an interface plane, or hub interface (28A) and is adapted to abut with a propeller hub (18). In order to reinforce the shaft (22) and/or its front flange (27), a web (40) extends radially inwardly from the inner surface (33) of the shaft (22). The web (40) intersects with a central axis of the shaft (22). The web (4) is located relative to the front flange (27) such that at least part of the web (40) is radially aligned with the front flange (27) along the central axis of the shaft (22). The web (4) has at least one perforation extending therethrough to allow fluid flow communication in/out of the hollowed interior of the shaft (22).

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, while an airborne turboprop engine 10 is shown in FIG. 1, it is to be understood that the present disclosure could apply to other types of aircraft engines, including for example turboshaft engines. Yet further modifications could be implemented by a person of ordinary skill in the art in view of the present disclosure, which modifications would be within the scope of the present technology.

The invention claimed is:

1. A propeller shaft for a propeller shaft assembly of an aircraft engine, the propeller shaft having:
    an annular wall extending circumferentially about a shaft axis and circumscribing a hollowed interior defining a cavity in a front end portion of the shaft, the annular wall having an outer surface facing radially outwardly from the shaft and an inner surface spaced apart from the outer surface and facing radially inwardly to the hollowed interior;
    a front flange projecting radially outwardly away from the annular wall, the front flange defining a hub side surface and an engine side surface opposite the hub side surface and axially spaced apart therefrom, the hub side surface of the front flange defining an interface plane and adapted to abut with a propeller hub; and
    a reinforcement web extending transversely through the cavity and intersecting the shaft axis, wherein at least part of the reinforcement web is radially aligned with the front flange, the reinforcement web having a plurality of perforations defining fluid channels through the reinforcement web, the fluid channels through the reinforcement web configured to provide fluid flow communication between the cavity and the propeller hub.

2. The propeller shaft assembly as defined in claim 1, wherein the reinforcement web defines a fillet facing inwardly towards the central axis, the fillet located on an engine side of the reinforcement web opposite a hub side of the reinforcement web, the front flange defines a fillet facing outwardly away from the central axis, the fillet of the front flange located on an engine side of the front flange opposite a hub side of the front flange.

3. The propeller shaft assembly as defined in claim 2, wherein at least part of the fillet of the reinforcement web is radially aligned with the fillet of the front flange along the central axis.

4. The propeller shaft assembly as defined in claim 3, wherein the fillet of the reinforcement web extending axially along the central axis from a front fillet end to a rear fillet end, the rear fillet end axially offset from that of the fillet of the front flange.

5. The propeller shaft as defined in claim 4, wherein the fillet of the reinforcement web has a radius R2 and the fillet of the front flange has a radius R1, wherein a ratio of R2 over R1 having a value of at least 0.2 and at most 3.0.

6. The propeller shaft assembly as defined in claim 1, wherein the shaft has an equivalent open cross-section at the front end of the shaft, the equivalent open cross-section delimited peripherally by an axial projection of the inner surface of the annular wall, the plurality of perforations having a total surface area equal to between 10% and 80% of the equivalent open cross-section.

7. A propeller shaft assembly for an aircraft engine, comprising:
a shaft, and a propeller hub coupled to the shaft, the shaft having:
a front end portion extending from a front end of the shaft;
an annular wall extending circumferentially about a shaft axis and circumscribing a hollowed interior defining a cavity in the front end portion, the annular wall having an outer surface facing radially outwardly from the shaft and an inner surface spaced apart from the outer surface and facing radially inwardly to the cavity;
a front flange projecting radially outwardly from the annular wall, the front flange defining a hub side surface and an engine side surface opposite the hub side surface and axially spaced apart therefrom, the hub side surface of the front flange defining an interface plane and adapted to abut with a propeller hub; and
a reinforcement web defining an end wall of the cavity, the reinforcement web extending radially inwardly from the inner surface of the annular wall, at least part of the reinforcement web radially aligned with the front flange, a plurality of perforations extending through the reinforcement web, the plurality of perforations open at the front end of the shaft, the plurality of perforations defining fluid channels through the reinforcement web; and
the propeller hub having:
a flange engaging surface abutting against the hub side surface of the front flange, the propeller hub coupled to the shaft via the front flange; and
wherein the fluid channels through the reinforcement web configured to provide fluid flow communication between the cavity and the propeller hub.

8. The propeller shaft assembly as defined in claim 7, wherein the reinforcement web defines a fillet facing inwardly towards the central axis, the fillet located on an engine side of the reinforcement web opposite a hub side of the reinforcement web, the front flange defines a fillet facing outwardly away from the central axis, the fillet of the front flange located on an engine side of the front flange opposite a hub side of the front flange.

9. The propeller shaft assembly as defined in claim 8, wherein the fillet of the reinforcement web extends axially along the central axis from a front fillet end to a rear fillet end, the rear fillet end axially offset from that of the fillet of the front flange.

10. The propeller shaft assembly as defined in claim 8, wherein the fillet of the reinforcement web has a radius R2 and the fillet of the front flange has a radius R1, a ratio of R2 over R1 having a value of at least 0.2 and at most 3.0.

11. The propeller shaft assembly as defined in claim 8, wherein at least part of the fillet of the reinforcement web is radially aligned with the fillet of the front flange along the central axis.

12. The propeller shaft assembly as defined in claim 7, wherein the reinforcement web has a hub side surface and an engine side surface opposite the hub side surface, the reinforcement web having a minimum thickness TR measured along the central axis of the shaft, from the hub side surface to the engine side surface of the reinforcement web, the front flange having a minimum thickness T measured along the central axis of the shaft, from the hub side surface to the engine side surface of the front flange, a ratio TR over T having a value between 0.1 and 3.0.

13. The propeller shaft assembly as defined in claim 7, wherein the shaft has an equivalent open cross-section at the front end of the shaft, the equivalent open cross-section delimited peripherally by an axial projection of the inner surface of the annular wall, the plurality of perforations having a total surface area equal to between 10% and 80% of the equivalent open cross-section.

14. The propeller shaft assembly as defined in claim 7, wherein the plurality of perforations have a round shape, an elongated slot shape or a teardrop shape.

15. The propeller shaft assembly as defined in claim 7, wherein the reinforcement web has a wall having a hub side surface and an engine side surface opposite the hub side surface, the engine side surface of the front flange extending axially beyond the engine side surface of the reinforcement web in a direction extending away from the front end of the shaft along the central axis.

16. The propeller shaft assembly as defined in claim 7, wherein the reinforcement web has a front surface facing in a direction opposite that of the engine side surface of the front flange, the front surface axially offset from the front end of the shaft along the central axis.

17. The propeller shaft assembly as defined in claim 16, wherein the front surface of the reinforcement web is axially offset with respect to the hub side surface of the front flange along the central axis, the hub side surface of the front flange closer from the front end of the shaft than the front surface of the reinforcement web is from the front end of the shaft.

18. The propeller shaft assembly as defined in claim 7, wherein the propeller hub is removably secured to the front flange via fasteners, the flange engaging surface axially engaging the hub side surface of the front flange when secured to the front flange.

* * * * *